(12) United States Patent
Liu

(10) Patent No.: US 9,977,141 B2
(45) Date of Patent: May 22, 2018

(54) VELOCITY TOMOGRAPHY USING PROPERTY SCANS

(71) Applicant: Jonathan Liu, Houston, TX (US)

(72) Inventor: Jonathan Liu, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 342 days.

(21) Appl. No.: 14/818,958

(22) Filed: Aug. 5, 2015

(65) Prior Publication Data

US 2016/0109589 A1    Apr. 21, 2016

Related U.S. Application Data

(60) Provisional application No. 62/066,206, filed on Oct. 20, 2014.

(51) Int. Cl.
*G01V 1/30* (2006.01)
*G01V 1/28* (2006.01)

(52) U.S. Cl.
CPC .............. *G01V 1/282* (2013.01); *G01V 1/303* (2013.01); *G01V 1/306* (2013.01); *G01V 1/301* (2013.01); *G01V 2210/51* (2013.01); *G01V 2210/52* (2013.01); *G01V 2210/614* (2013.01); *G01V 2210/622* (2013.01); *G01V 2210/626* (2013.01);
(Continued)

(58) Field of Classification Search
CPC ........ G01V 1/303; G01V 1/306; G01V 1/301; G01V 1/282; G01V 2210/51; G01V 2210/52; G01V 2210/614; G01V 2210/622; G01V 2210/626; G01V 2210/671; G01V 2210/675
See application file for complete search history.

(56) References Cited

U.S. PATENT DOCUMENTS

| | | | |
|---|---|---|---|
| 3,812,457 | A | 5/1974 | Weller |
| 3,864,667 | A | 2/1975 | Bahjat |
| 4,159,463 | A | 6/1979 | Silverman |

(Continued)

FOREIGN PATENT DOCUMENTS

| | | |
|---|---|---|
| CA | 2 796 631 | 11/2011 |
| EP | 1 094 338 | 4/2001 |

(Continued)

OTHER PUBLICATIONS

Mora, P. (1987), "Elastic Wavefield Inversion," PhD Thesis, Stanford University, pp. 22-25.

(Continued)

*Primary Examiner* — Bryan Bui
(74) *Attorney, Agent, or Firm* — ExxonMobil Upstream Research Company Law Department

(57) ABSTRACT

Method for building a subsurface model of velocity or other elastic property from seismic reflection data using tomography. The method uses velocity scans to pick a focusing velocity model at each image point (40). The focusing velocities are used to pick depth errors from tables (60) generated using a tomographic inversion matrix (30) and a suite of different velocity models (10). The depth errors are then reconstructed at each image point from the velocity scans based on the difference between the base velocity model and the most coherent velocity from the scan (70). The reconstructed depth errors are used to compute the velocity model update (80).

12 Claims, 1 Drawing Sheet

(52) U.S. Cl.
CPC .. *G01V 2210/671* (2013.01); *G01V 2210/675* (2013.01)

(56) References Cited

U.S. PATENT DOCUMENTS

| | | |
|---|---|---|
| 4,168,485 A | 9/1979 | Payton et al. |
| 4,545,039 A | 10/1985 | Savit |
| 4,562,650 A | 1/1986 | Nagasawa et al. |
| 4,575,830 A | 3/1986 | Ingram et al. |
| 4,594,662 A | 6/1986 | Devaney |
| 4,636,957 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,838 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,905,916 B2 | 6/2005 | Bartsch et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,027,927 B2 | 7/2006 | Routh et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,547,794 B2 | 10/2013 | Gulati et al. |
| 8,688,381 B2 | 4/2014 | Routh et al. |
| 8,781,748 B2 | 7/2014 | Laddoch et al. |
| 2002/0049540 A1 | 4/2002 | Beve et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225438 A1 | 11/2004 | Okoniewski et al. |
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Krauklis et al. |
| 2009/0070042 A1 | 3/2009 | Birchwood et al. |
| 2009/0083006 A1 | 3/2009 | Mackie |
| 2009/0116336 A1* | 5/2009 | Summerfield ......... G01V 1/303 367/38 |
| 2009/0164186 A1 | 6/2009 | Haase et al. |
| 2009/0164756 A1 | 6/2009 | Dokken et al. |
| 2009/0187391 A1 | 7/2009 | Wendt et al. |

(56) References Cited

U.S. PATENT DOCUMENTS

| | | |
|---|---|---|
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212902 A1 | 8/2010 | Baumstein et al. |
| 2010/0246324 A1 | 9/2010 | Dragoset, Jr. et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0299070 A1 | 11/2010 | Abma |
| 2011/0000678 A1 | 1/2011 | Krebs et al. |
| 2011/0040926 A1 | 2/2011 | Donderici et al. |
| 2011/0051553 A1 | 3/2011 | Scott et al. |
| 2011/0075516 A1 | 3/2011 | Xia et al. |
| 2011/0090760 A1 | 4/2011 | Rickett et al. |
| 2011/0103187 A1* | 5/2011 | Albertin .............. G01V 1/28 367/73 |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0218859 A1 | 8/2012 | Soubaras |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0060539 A1 | 3/2013 | Baumstein |
| 2013/0081752 A1 | 4/2013 | Kurimura et al. |
| 2013/0238246 A1 | 9/2013 | Krebs et al. |
| 2013/0279290 A1 | 10/2013 | Poole |
| 2013/0282292 A1 | 10/2013 | Wang et al. |
| 2013/0311149 A1 | 11/2013 | Tang |
| 2013/0311151 A1 | 11/2013 | Plessix |
| 2014/0350861 A1 | 11/2014 | Wang et al. |
| 2014/0358504 A1 | 12/2014 | Baumstein et al. |
| 2014/0372043 A1 | 12/2014 | Hu et al. |

FOREIGN PATENT DOCUMENTS

| | | |
|---|---|---|
| EP | 1 746 443 | 1/2007 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2010/085822 | 7/2010 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), "*Numerical Optimization, Chapt. 7—Large-Scale Unconstrained Optimization,*" Springer, New York, $2^{nd}$ Edition, pp. 165-176.

Nocedal, J. et al. (2000), "Numerical Optimization—Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & $72^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

Romero, L.A. et al. (2000), Phase encoding of shot records in prestack migration, *Geophysics* 65, pp. 426-436.

Ronen S. et al. (2005), "Imaging Downgoing waves from Ocean Bottom Stations," *SEG Expanded Abstracts*, pp. 963-967.

Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.

(56) References Cited

OTHER PUBLICATIONS

Ryden, N. et al. (2006), "Fast simulated annealing inversion of surface waves on pavement using phase-velocity spectra," *Geophysics* 71(4), pp. R49-R58.
Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multi-component OBC seismic data," *Geophysical Prospecting* 56, pp. 843-862.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," $73^{rd}$ Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 592-606.
Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.
Soubaras, R. et al. (2007), "Velocity model building by semblance maximization of modulated-shot gathers," *Geophysics* 72(5), pp. U67-U73.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. P.SM213-SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-2205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Liu, Z., "An analytical approach to migration velocity analysis," *Geophysics* 62(4), pp. 1238-1249 (Jul. 1, 1997).
Gao, H. et al. (2008), "Implementation of perfectly matched layers in an arbitrary geometrical boundary for leastic wave modeling," *Geophysics J. Int.* 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.

Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG $75^{th}$ Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.
Helbig, K. (1994), "Foundations of Anisotropy for Exploration Seismics," Chapter 5, pp. 185-194.
Henmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and $70^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," $70^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.

(56) References Cited

OTHER PUBLICATIONS

Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-waveform inversion: a dimenstionality-reduction approach," $80^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.
Abt, D.L. et al. (2010), "North American lithospheric discontinuity structured imaged by Ps and Sp receiver functions", *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods vol. I—Chapter 7—Surface Waves in a Vertically Heterogenous Medium," W.H. Freeman and Co., pp. 259-318.
Aki, K. et al. (1980), "Quantitative Seismology: Theory and Methods vol. I," W.H. Freeman and Co., p. 173.
Aki et al. (1980), "Quantitative Seismology, Theory and Methods," Chapter 5.20, W.H. Freeman & Co., pp. 133-155.
Amundsen, L. (2001), "Elimination of free-surface related multiples without need of the source wavelet," *Geophysics* 60(1), pp. 327-341.
Anderson, J.E. et al. (2008), "Sources Near the Free-Surface Boundary: Pitfalls for Elastic Finite-Difference Seismic Simulation and Multi-Grid Waveform Inversion," $70^{th}$ EAGE Conf. & Exh., 4 pgs.
Barr, F.J. et al. (1989), "Attenuation of Water-Column Reverberations Using Pressure and Velocity Detectors in a Water-Bottom Cable," $59^{th}$ Annual SEG meeting, *Expanded Abstracts*, pp. 653-656.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.
Beasley, C. (2012), "A 3D simultaneous source field test processed using alternating projections: a new active separation method," *Geophsyical Prospecting* 60, pp. 591-601.
Beaty, K.S. et al. (2003), "Repeatability of multimode Rayleigh-wave dispersion studies," *Geophysics* 68(3), pp. 782-790.
Beaty, K.S. et al. (2002), "Simulated annealing inversion of multimode Rayleigh wave dispersion waves for geological structure," *Geophys. J. Int.* 151, pp. 622-631.
Becquey, M. et al. (2002), "Pseudo-Random Coded Simultaneous Vibroseismics," SEG Int'l. Exposition and 72th Annl. Mtg., 4 pgs.

Ben-Hadj-Ali, H. et al. (2009), "Three-dimensional frequency-domain full waveform inversion with phase encoding," *SEG Expanded Abstracts*, pp. 2288-2292.
Ben-Hadj-Ali, H. et al. (2011), "An efficient frequency-domain full waveform inversion method using simultaneous encoded sources," *Geophysics* 76(4), pp. R109-R124.
Benitez, D. et al. (2001), "The use of the Hilbert transform in ECG signal analysis," *Computers in Biology and Medicine* 31, pp. 399-406.
Berenger, J-P. (1994), "A Perfectly Matched Layer for the Absorption of Electromagnetic Waves," *J. of Computational Physics* 114, pp. 185-200.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Beylkin, G. (1985), "Imaging of discontinuities in the inverse scattring problem by inversion of a causal generalized Radon transform," *J. Math. Phys.* 26, pp. 99-108.
Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.
Choi, Y. et al. (2011), "Application of encoded multisource waveform inversion to marine-streamer acquisition based on the global correlation," $73^{rd}$ EAGE Conference, *Abstract*, pp. F026.
Choi, Y et al. (2012), "Application of multi-source waveform inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms Via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J.W. et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J. Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.

(56) References Cited

OTHER PUBLICATIONS

Etgen, J.T. et al. (2007), "Computational methods for large-scale 3D acoustic finite-difference modeling: A tutorial," *Geophysics* 72(5), pp. SM223-SM230.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Forbriger, T. (2003), "Inversion of shallow-seismic wavefields: I. Wavefield transformation," *Geophys. J. Int.* 153, pp. 719-734.

U.S. Appl. No. 14/329,431, filed Jul. 11, 2014, Krohn et al.

U.S. Appl. No. 14/330,767, filed Jul. 14, 2014, Tang et al.

Jiao, J. et al. (2006), "An improved methodology for sub-salt velocity analysis," SEG/New Orleans 2006 Annual Meeting, *Expanded Abstracts*, pp. 3105-3109.

Liu, Z. (1997), "An analytical approach to migration velocity analysis," *Geophysics* 62(4), pp. 1238-1249.

Wang, B. et al. (2006), "A 3D subsalt tomography based on wave-equation migration-perturbation scans," *Geophysics* 71(2), pp. E1-E6.

Tarantola, A. (1986), "A strategy for nonlinear elastic inversion of seismic reflection data," *Geophysics* 51(10), pp. 1893-1903.

Tarantola, A. (1988), "Theoretical background for the inversion of seismic waveforms, including elasticity and attenuation," *Pure and Applied Geophysics* 128, pp. 365-399.

Tarantola, A. (2005), "Inverse Problem Theory and Methods for Model Parameter Estimation," *SIAM*, pp. 79.

Tarantola, A. (1984), "Inversion of seismic reflection data in the acoustic approximation," *Geophysics* 49, pp. 1259-1266.

Trantham, E.C. (1994), "Controlled-phase acquisition and processing," *SEG Expanded Abstracts* 13, pp. 890-894.

Tsvankin, I. (2001), "Seismic Signatures and Analysis of Reflection Data in Anisotropic Media," Elsevier Science, p. 8.

Valenciano, A.A. (2008), "Imaging by Wave-Equation Inversion," A Dissertation, Stanford University, 138 pgs.

van Groenestijn, G.J.A. et al. (2009), "Estimating primaries by sparse inversion and application to near-offset reconstruction," *Geophyhsics* 74(3), pp. A23-A28.

van Manen, D.J. (2005), "Making wave by time reversal," SEG International Exposition and 75th Annual Meeting, *Expanded Abstracts*, pp. 1763-1766.

Verschuur, D.J. (2009), Target-oriented, least-squares imaging of blended data, 79th Annual Int'l. Meeting, *SEG Expanded Abstracts*, pp. 2889-2893.

Verschuur, D.J. et al. (1992), "Adaptive surface-related multiple elimination," *Geophysics* 57(9), pp. 1166-1177.

Verschuur, D.J. (1989), "Wavelet Estimation by Prestack Multiple Elimination," *SEG Expanded Abstracts* 8, pp. 1129-1132.

Versteeg, R. (1994), "The Marmousi experience: Velocity model determination on a synthetic complex data set," *The Leading Edge*, pp. 927-936.

Vigh, D. et al. (2008), "3D prestack plane-wave, full-waveform inversion," *Geophysics* 73(5), pp. VE135-VE144.

Wang, Y. (2007), "Multiple prediction through inversion: Theoretical advancements and real data application," Geophysics 72(2), pp. V33-V39.

Wang, K. et al. (2009), "Simultaneous full-waveform inversion for source wavelet and earth model," SEG Int'l. Expo. & Ann. Meeting, Expanded Abstracts, pp. 2537-2541.

Weglein, A.B. (2003), "Inverse scattering series and seismic exploration," *Inverse Problems* 19, pp. R27-R83.

Wong, M. et al. (2010), "Joint least-squares inversion of up- and down-going signal for ocean bottom data sets," *SEG Expanded Abstracts* 29, pp. 2752-2756.

Wu R-S. et al. (2006), "Directional illumination analysis using beamlet decomposition and propagation," *Geophysics* 71(4), pp. S147-S159.

Xia, J. et al. (2004), "Utilization of high-frequency Rayleigh waves in near-surface geophysics," *The Leading Edge*, pp. 753-759.

Xie, X. et al. (2002), "Extracting angle domain information from migrated wavefield," *SEG Expanded Abstracts*21, pp. 1360-1363.

Xie, X.-B. et al. (2006), "Wave-equation-based seismic illumination analysis," *Geophysics* 71(5), pp. S169-S177.

Yang, K. et al. (2000), "Quasi-Orthogonal Sequences for Code-Division Multiple-Access Systems," *IEEE Transactions on Information Theory* 46(3), pp. 982-993.

Yoon, K. et al. (2004), "Challenges in reverse-time migration," *SEG Expanded Abstracts* 23, pp. 1057-1060.

Young, J. et al. (2011), "An application of random projection to parameter estimation in partial differential equations," SIAM, 20 pgs.

Zhang, Y. (2005), "Delayed-shot 3D depth migration," *Geophysics* 70, pp. E21-E28.

Ziolkowski, A. (1991), "Why don't we measure seismic signatures?," *Geophysics* 56(2), pp. 190-201.

\* cited by examiner

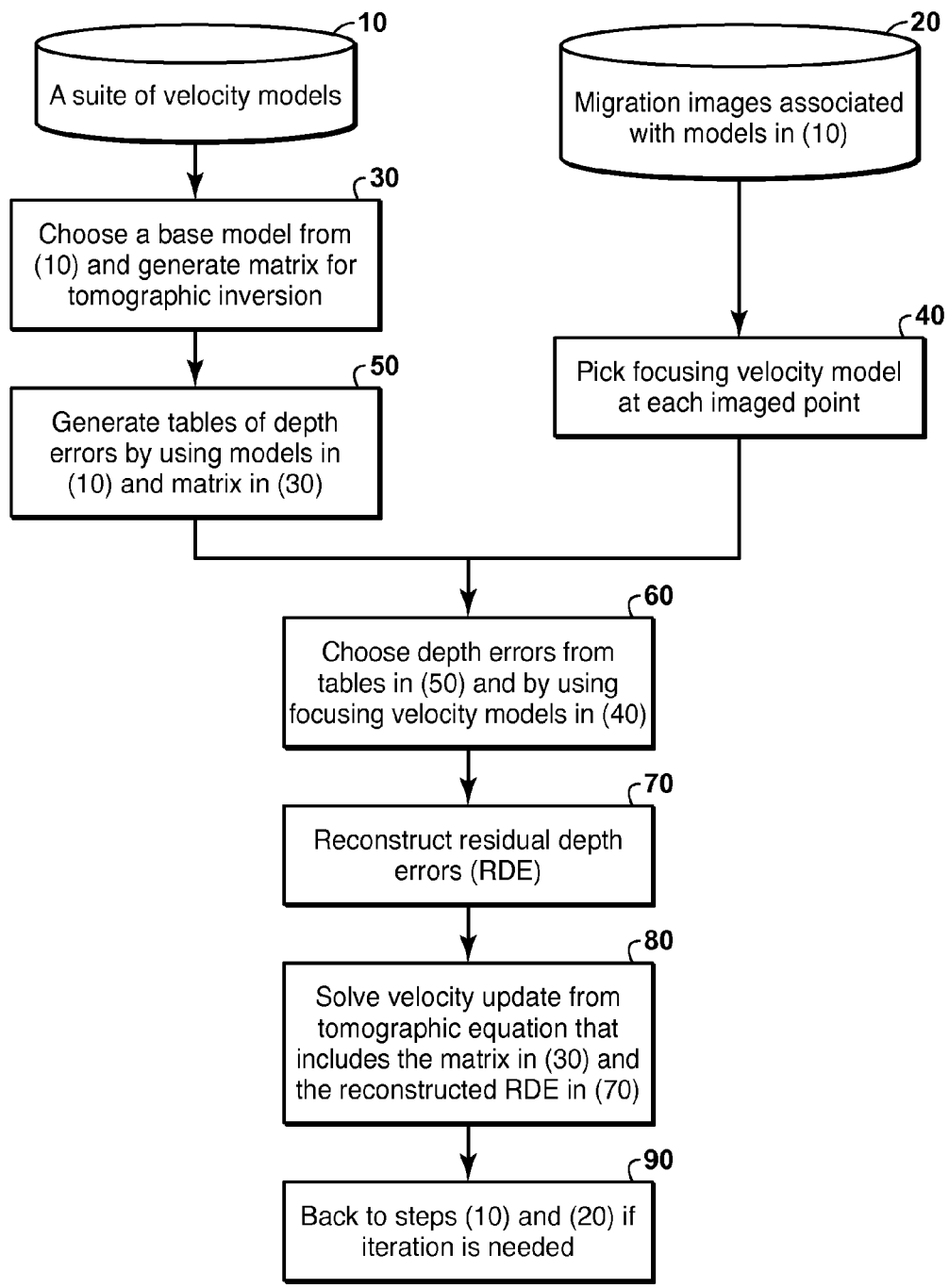

VELOCITY TOMOGRAPHY USING PROPERTY SCANS

CROSS-REFERENCE TO RELATED APPLICATION

This application claims the benefit of U.S. Provisional Patent Application 62/066,206, filed Oct. 20, 2014, entitled VELOCITY TOMOGRAPHY USING PROPERTY SCANS, the entirety of which is incorporated by reference herein.

FIELD OF THE INVENTION

Technological Field

This disclosure relates generally to the field of geophysical prospecting and, more particularly, to seismic data processing. Specifically, this disclosure concerns a method for building a subsurface velocity model from seismic reflection data using tomography, where the velocity model will be used in subsequent processing of the seismic data to prospect for hydrocarbons.

Background of the Invention

Tomography may be defined as a method for finding the velocity and reflectivity distribution from a multitude of observations using combinations of source and receiver locations. (*Encyclopedic Dictionary of Applied Geophysics*, 4$^{th}$ Ed., R. E. Sheriff) Reflection tomography uses data from a seismic survey in which both sources and receivers were placed on the surface. In reflection tomography, migrated gathers (offset or angle gathers) are used for updating the velocity model, and the flatness of the gathers, which is measured by the depth differences of the same reflection event in the different traces of a gather, provides information whether the migration velocity model is correct or not. Typically, there is no depth difference of the same reflection event in all traces of each gather, when the migration velocity model is correct. Those depth differences are also called residual depth errors ("RDE") because they describe the relative depths errors of the same reflection event in different traces of a gather. The velocity model may then be perturbed, with the objective of reducing the RDE, and the process is repeated iteratively to optimize the model.

The term velocity model or physical property model as used herein refers to an array of numbers, typically a 3-D array, where each number, which may be called a model parameter, is a value of velocity or another physical property in a cell, where a subsurface region has been conceptually divided into discrete cells for computational purposes.

Successful implementation of reflection tomography for velocity model building requires reliable measurement of the residual depth errors in a migrated subsurface image. (Migration, or imaging, is a data processing technique that moves subsurface reflectors to their correct locations.) Direct measurement of RDE is difficult in complex imaging areas, such as sub-salt. Velocity scanning provides an alternative way to update velocity model in complex imaging areas. A velocity scan, or velocity panel, may be defined as a display of the coherency when various normal moveouts, implying various velocities, are assumed. (Sheriff, op. cit.) The coherency may be judged, for example, according to which velocity model images a reflection point most nearly to the same depth, i.e. the flattest. Published methods to use velocity scanning in this way include the following.

Jiao, et al. (2006) proposed a 1D vertical updating method. This method updates the velocity model from scans by using a formula based on a 1D assumption. A drawback of this method is inaccurate formulation for complex structures where the 1D assumption is invalid.

Wang, et al. (2006) disclosed a 3D kinematic demigration/remigration updating method. This method converts velocity scans into RDE by kinematic demigration and remigration. The estimated RDE will be used for model updating by tomography. A drawback of this method is that kinematic demigration/remigration is a complicated process in which stability and accuracy are difficult to achieve.

SUMMARY OF THE INVENTION

In one embodiment, the invention is a method for a scientific method for transforming seismic data into a subsurface physical property model, comprising constructing the subsurface physical property model by performing tomographic inversion of the seismic data, using a computer, with residual depth errors reconstructed using property scanning, wherein the residual depth errors are reconstructed using the following relationship at each imaging point DA $(v_m - v_f)$ where A is a matrix built from ray tracing, $v_m$ is a base migration model of the property, $v_f$ is a model of the property as picked from a property scan of migrated seismic data, and deviation operator D is defined by its operation on an arbitrary n-dimensional vector a={$a_j$}, $$(Da)_j = a_j - \sum_i \frac{a_i}{n}$$

where indices i and j denote different source-receiver offsets among a total of n offsets present in the migrated seismic data.

BRIEF DESCRIPTION OF THE DRAWINGS

The present invention and its advantages will be better understood by referring to the following detailed description and the attached drawings in which:

FIG. 1 is a flow chart showing basic steps in one embodiment of the present inventive method.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Velocity tomography relies on reliable measurement of RDE, which may not be available in complex imaging areas. In the present invention, a formula is derived that allows one to directly reconstruct RDE from velocity scans. The reconstructed RDE can be imported into conventional tomographic inversion work flow, so that the model will be updated through velocity tomographic inversion. The derivation of the formula is based on the fact that a migrated gather at a reflection point (also called image point) is flat when the depth image is focused at this location, i.e. when the image was migrated using the velocity model that best focuses the image at this location. In other words, for each image point, a velocity scan is constructed, and the scan displays coherency, at that image point, for minimum RDE or maximum stacking power, for different migration images (gathers or stacked section), each representing a different velocity model.

A formula, for which the derivation is given in the Appendix, to reconstruct RDE from velocity scans can be expressed at each imaging point as:

$$Dz_m = DA(v_m - v_f) \quad (1)$$

where $Dz_m$ is the reconstructed RDE, $z_m$ is migrated depth, D is an operator that may be called the deviation operator, A is a matrix that consists of the derivatives of the imaged depths with respect to parameters of the velocity model, $v_m$ is a vector containing the base migration velocity model parameters, and $v_f$ is a vector containing the parameters of the focusing velocity model picked from property scanning, i.e. from coherency comparison of two or more velocity models. The elements of the matrix A will depend on the model that is used to image the data. A velocity model parameter is the value of wave propagation velocity at a particular cell in the discrete model, typically in 3-D space. Base velocity refers to an initial or current velocity model, and the focusing velocity refers to the velocity model that gives the most coherent result in the velocity scan that is focused on the particular image point.

The validity of equation (1) is based on an assumption of a small perturbation. Thus, the difference between the base migration velocity vm and the velocity of picked from the velocity scan should be small, for example <10%. In other words, for the velocity scan, the user selects velocity models that differ from each other by less than some preselected tolerance.

For an n-dimensional vector $a = \{a_j\}$, Da is defined by $$(Da)_j = a_j - \sum_i \frac{a_i}{n} \quad (2)$$

where j is the offset index and the sum is over the number n of different offsets present in the data. Thus, equation (2) defines the operator D, i.e. Dz measures the difference for the imaged depths of the same reflection event at different offsets—in other words, a measure of how much error exists in the migration velocity model. The matrix A will be computed in a conventional tomographic inversion work flow; see, for example, Liu—Ref [2], which reference is incorporated herein in all jurisdictions that allow it. The deviation of equation (1) uses the fact of $Dz_f = 0$. After the RDE is reconstructed in equation (1) for each image point, an equation is formed to solve for a corresponding velocity model update, $\Delta v$:

$$(DA)\Delta v = Dz_m, \quad (3)$$

which equation must be solved by numerical methods, using a computer of course for any practical application. Invariably, no one model in the velocity panel will best focus every image point, and therefore equation (3) represents the synthesis of all the different focusing velocities to make the best update to the entire base velocity model. Equation (3) is the same velocity model update equation that is typically used in conventional tomography. The difference in the case of the present invention is that $Dz_m$ is given by equation (1).

Compared to a conventional tomographic inversion work flow, which estimates Dzm from migrated gathers that are generated using the base migration velocity, the present inventive method obtains a more reliable estimation of Dzm in complex imaging areas, and, therefore, is a more effective way for velocity updating.

FIG. 1 is a flow chart showing basic steps in one example embodiment of the present inventive method. It is not shown in the drawings, but a seismic data set is an input quantity required for steps 20 and 30. The seismic data may consist of, for example, common-offset gathers or common-shot gathers. In step 10, a suite of velocity models is selected, being mindful of the small perturbation assumption. In step 30, a base model is selected, typically one of the velocity models from step 10. (The term "model" as used in this illustrative example embodiment refers to a velocity model, but in the case of an anisotropic medium, this can be a model of a component of velocity, for example the vertical component or the horizontal component, or a model of any one or more of the anisotropy parameters, or the term can refer to any other property of the medium that affects a kinematic property of propagation of acoustic waves, for example the position of horizons that define a region in a velocity model.) The base model is the starting model for the iterative tomography inversion process. Also, the matrix A for the tomographic inversion is generated—see ref [2] for details. The matrix A operating on a velocity model will predict the depth of each image point according to that velocity model. In step 50, tables of the depth errors are generated for a plurality of image points (preferably all, but at least enough to make an image) for each model selected in step 10. The depth error for each image point is the difference in migrated depth as migrated by a velocity model from step 10 as compared to when migrated by the base migration model. A table of depth errors for a particular image point will thus show a value of depth error for each of various migration velocity models at that image point.

In step 20, migrated images are formed from the seismic data using each of the velocity models selected in step 10. In step 40, at each image point, a focusing velocity model is selected, i.e. the velocity model (picked from among the velocity models 10) that maximizes coherency. For example, each trace in a common-image gather (a gather of traces that have a common image point but different offsets) after migration using any one of the velocity models 10 will image a particular reflection point at a somewhat different depth. The selection in step 40 may be performed by picking the migration velocity model that generates the flattest (same depth) migrated gathers at the particular image point. The migrated gathers may, for example, be offset gathers generated by Kirchhoff or beam migration, or angle gathers generated by shot beam migration or wave equation based migration. As an alternative, data representing different offsets may be stacked (summed), and then migrated, and the picking might choose the best migrated stack response, e.g. the best stacked images as generated by Kirchhoff, beam, or wave equation based migration. It should be noted that the method used for picking a velocity model from velocity scan panels is not within the scope of the present inventive method. Any picking method may be used for purposes of the present invention.

In step 50, the depth error tables are generated. This is done by multiplying the tomographic inversion matrix A from step 30 by the difference between the base migration velocity model and, in turn, each of the suite of velocity models selected in step 10, where the velocity models are expressed as vectors.

In step 60, a depth error is obtained for each image point from the tables from step 50, by picking the error corresponding to the focusing velocity model. Then, in step 70, the depth errors from step 60 are reconstructed using the present inventive method, by applying equation (1) or some equivalent expression.

In step 80, the velocity model update is obtained by numerically solving equation (3) or an equivalent expression for Δv. The right-hand side of equation (3) is the reconstructed residual depth error from step 70, and the matrix A, which is composed of the gradients of imaged depth with respect to the model parameters, comes from step 30.

It may be noted that conventional tomographic inversion using measured RDE's can be represented just by step 30, a simplified step 70 specifying direct measurement of RDE, then steps 80 and 90. Steps 10-40 are common to previous attempts to use velocity scans to update the velocity model.

In an alternative embodiment of the invention, instead of using only the reconstructed residual depth errors in step 80, step 80 may be performed using the reconstructed residual depth errors combined with residual depth errors generated using the base migration velocity model.

The accuracy of the updated model can be improved by iterating the process (step 90), i.e. returning to the steps 10 and 20, and using the updated model as the base model in step 30. If the suite of velocity models 10 from the previous iteration is considered suitable to use again, the next iteration may skip steps 10, 20, and 40, and begin with step 30 and proceed to 50, 60 and beyond. Preferably, however, the suite of velocity models should be regenerated in step 10 using the new base model, for example with scaling factors.

Software for executing the present inventive method on a computer can be developed by adapting existing tomographic inversion software to incorporate the present inventive method for reconstructing residual depth errors. Existing software will, for example, generate the matrix A and solve an equation similar to equation (3), and perform other computational steps needed in tomographic inversion. The tomographic inversion used in the present inventive method may be ray-based or wave-based.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

Appendix (Derivation of Equation 1)

Reflection tomographic inversion may be described by $$A\Delta v = \Delta z \quad (A-1)$$

where A is a matrix built from ray tracing, $$\Delta v = v_m - v_t$$

$$\Delta z = z_m - z_t$$

$v_m$ is the migration velocity, $v_t$ is the true velocity, $z_m$ is migration depth, corresponding to $v_m$, and $z_t$ is the true depth corresponding to $v_t$.

To eliminate $z_t$, the deviation operator, D, may be applied over offset index on equation (A-1):

$$(DA)\Delta v = Dz_m \quad (A-2)$$

where $Dz_t = 0$ Is used. Deviation of a n-dimensional vector, $z = \{z_i\}$, is defined by $$(Dz)_i \equiv z_i - \frac{1}{n}\sum_j z_j \quad (A-3)$$

Equation (A-2) is used to update velocity from RDE in conventional tomographic inversion. A modified version of equation (A-1) is $$A(v_m - v_f) = z_m - z_f \quad (A-4)$$

Where $v_f$ is focusing velocity picked from velocity scans, and $z_f$ is focused migration depth corresponding to $v_f$. Applying the deviation operator, D, to equation (A-4) yields $$(DA)(v_m - v_f) = Dz_m \quad (A-5)$$

where $Dz_f = 0$ Is used. Q.E.D.

It should be noted that the validity of equations (A-1) and (A-4) depends upon a linearized approximation, which assumes a small perturbation between velocity models.

REFERENCES

1. Jiao, J., Lowrey, D., Willis, J., and Solano, D., "An improved methodology for sub-salt velocity analysis," *SEG Expanded Abstracts*, 3105-3109 (2006).
2. Liu, Z., "An analytical approach to migration velocity analysis," *Geophysics* 62, 1238-1249 (1997).
3. Wang, B., "A 3D subsalt tomography based on wave-equation migration-perturbation scans," *Geophysics* 71, T129-T135 (2006).

The invention claimed is:

1. A scientific method for transforming seismic data into a subsurface physical property model, comprising:
    constructing the subsurface physical property model by performing tomographic inversion of the seismic data, using a computer, with residual depth errors reconstructed using property scanning;
    wherein the physical property is one of velocity, a vector component of velocity, one or more anisotropy parameters, and any other property of a medium that affects a kinematic property of propagation of acoustic waves,
    wherein the residual depth errors are reconstructed using the following relationship at each imaging point $$DA(v_m - v_f)$$

where A is a matrix built from ray tracing, $v_m$ is a base migration model of the property, $v_f$ is a model of the property as picked from a property scan of migrated seismic data, and deviation operator D is defined by its operation on an arbitrary n-dimensional vector $a = \{a_j\}$:

$$(Da)_j = a_j - \sum_i \frac{a_i}{n}$$

where indices i and j denote different source-receiver offsets among a total of n offsets present in the migrated seismic data,
    wherein the property model is constructed by computing an update to the base migration model, said update Δv being given by solving $$(DA)\Delta v = Dz_m$$

where $z_m$ is migrated depth, and
    wherein the property scanning includes,
        choosing a suite of property models,
        generating tables of depth errors for each property model in the suite using the matrix A,
        forming images by migrating the seismic data using each property model in the suite,
        picking a focusing property at a plurality of image points, and using the tables of depth errors, finding a depth error that corresponds to each focusing property.

2. The tomographic method of claim 1, wherein the migrated seismic data are formed into gathers of traces with a common image point but different offsets.

3. The tomographic method of claim 1, wherein matrix A comprises derivatives of imaged depths with respect to model parameters.

4. The method of claim 1, further comprising updating the base migration model with the update and repeating the method for at least one iteration.

5. The method of claim 1, wherein the suite of property models are generated based on the base migration model.

6. The method of claim 5, wherein the property models in the suite of property models do not differ from the base migration model by more than a pre-selected tolerance.

7. The method of claim 1, wherein the focusing property is picked based on flatness of the image points.

8. The method of claim 7, wherein the migrated data are formed into offset gathers generated by Kirchhoff or beam migration, or angle gathers generated by shot beam migration or wave equation based migration.

9. The method of claim 1, wherein the tables of depth errors are generated by multiplying the matrix A by the difference between the base migration model and a property model from the suite to simulate depth errors in the plurality of image points, and repeating for each property model in the suite, wherein each model is expressed as a vector.

10. The method of claim 1, wherein the tomographic inversion is ray-based tomographic inversion or wave-based tomographic inversion.

11. The method of claim 1, further comprising using the physical property model constructed from tomographic inversion for prospecting or producing hydrocarbons.

12. A non-transitory computer usable medium having a computer readable program code embodied therein, said computer readable program code adapted to be executed to implement a scientific method for transforming seismic data into a subsurface physical property model, comprising:

constructing the subsurface physical property model by performing tomographic inversion of the seismic data, with residual depth errors reconstructed using property scanning;

wherein the residual depth errors are reconstructed using the following relationship at each imaging point $$DA(v_m - v_f)$$

where A is a matrix built from ray tracing, $v_m$ is a base migration model of the property, $v_f$ is a model of the property as picked from a property scan of migrated seismic data, and deviation operator D is defined by its operation on an arbitrary n-dimensional vector $a = \{a_j\}$:

$$(Da)_j = a_j - \sum_i \frac{a_i}{n}$$

where indices i and j denote different source-receiver offsets among a total of n offsets present in the migrated seismic data, wherein the property model is constructed by computing an update to the base migration model, said update $\Delta v$ being given by solving $$(DA)\Delta v = Dz_m$$

where $z_m$ is migrated depth, and wherein the property scanning includes,
choosing a suite of property models,
generating tables of depth errors for each property model in the suite using the matrix A,
forming images by migrating the seismic data using each property model in the suite
picking a focusing property at a plurality of image points, and
using the tables of depth errors, finding a depth error that corresponds to each focusing property.

* * * * *